United States Patent
Hnatiuk

[11] Patent Number: 5,888,406
[45] Date of Patent: Mar. 30, 1999

[54] DEVICE FOR THE REMOVAL OF THIN SURFACE FILMS OF PETROLEUM PRODUCTS FROM THE WATER'S SURFACE

[76] Inventor: Ihor V. Hnatiuk, 7-A, Apt. 155, V1 Raisi Okinnoyi, 253167 Kyiv, Ukraine

[21] Appl. No.: 443,070

[22] Filed: May 17, 1995

[30] Foreign Application Priority Data

May 17, 1994 [UA] Ukraine ............................... VN 501744

[51] Int. Cl.$^6$ .............................. C02F 1/40; E02B 15/04
[52] U.S. Cl. ........................ 210/776; 210/242.3; 210/923
[58] Field of Search ............................. 210/242.1, 242.3, 210/923, 776

[56] References Cited

U.S. PATENT DOCUMENTS

| | | | |
|---|---|---|---|
| 3,690,463 | 9/1972 | O'Brien | 210/242.3 |
| 3,745,115 | 7/1973 | Olsen | 210/242.3 |
| 4,032,449 | 6/1977 | De Visser et al. | 210/923 |
| 4,111,809 | 9/1978 | Pichon | 210/923 |
| 4,378,291 | 3/1983 | Ward et al. | 210/923 |

FOREIGN PATENT DOCUMENTS

| | | |
|---|---|---|
| 1017775 A | 5/1983 | U.S.S.R. . |
| 1059059 A | 7/1983 | U.S.S.R. . |
| 1108167 A | 8/1984 | U.S.S.R. . |

OTHER PUBLICATIONS

English Abstact of Soviet Union Patent 1108167 A.

English Abstract of Soviet Union Patent 101775 A.

English Abstract of Soviet Union Patent 1059059 A.

*Primary Examiner*—Robert Popovics
*Attorney, Agent, or Firm*—Morgan & Finnegan LLP

[57] ABSTRACT

A skimmer for the removal of thin surface films of petroleum products from a water's surface. The skimmer uses air suction to effectively increase the volume of petroleum product removed, while at the same time being able to handle very thin films effectively. The skimmer uses a movable inner cover which is adjustable to the thickness of the petroleum product's film to reduce the amount of water drawn into the skimmer. An angled flange is also used to pull and concentrate the petroleum within the skimmer. Two vanes are used to maneuver the skimmer across the surface of the water to bring it into contact with the petroleum film on the surface of the water.

7 Claims, 1 Drawing Sheet

DEVICE FOR THE REMOVAL OF THIN SURFACE FILMS OF PETROLEUM PRODUCTS FROM THE WATER'S SURFACE

BACKGROUND OF THE INVENTION

1. Field of the Invention

The present invention is directed to a method and device for the removal of thin surface films of petroleum products from a water's surface.

2. Description of the Related Art

Various devices have been used for the removal of petroleum films. Such devices have utilized floats, skimmers and other above water devices which are made in the form of a spiral, labyrinth or plates. Such devices are shown in Soviet patent document nos. 1059059 (class "YE" 02V15/04) and 1017775 (class "YE" 02V17/00).

Those known devices, however, have many failings and shortcomings. Labyrinths slow the removal of the petroleum. Skimmers are very difficult to adjust for thin films and are highly susceptible to a large water intake when subjected to waves.

Further shortcomings that are known to exist for the removal of petroleum films, such as: with floats and skimmers, transferring to a container using a hose (vacuum), and having a cover with a fan to assist in the gathering of thin films (to make them thicker for easier removal). The skimmer has a pipe with holes along its circumference which blow at the petroleum product, pushing it into the skimmer, as in Soviet patent document no. 402609 (class "YE" 02V15/04).

The problem with such an arrangement is that the air disturbs the water's surface around the skimmer, thereby lowering the surface and reducing the efficiency of the system. To increase efficiency, the skimmer needs to be lowered. With the skimmer lowered, however, greater quantities of water are taken, thereby increasing the water/petroleum product ratio and increasing the amount of water which must later be removed from the fuel. If the state of the water is anything other than dead calm, waves further increase the amount of water picked-up by the skimmer.

With floating skimmers, a vertical tube with holes in it for the removal of the petroleum product is used. This system reduces the amount of water, but it still collects a large amount of water in the water/petroleum product mix. This skimmer also has a cover over the skimmer to reduce water intake due to wave action. Such an arrangement is shown in Soviet patent document no. 1108167 (class "YE" 02V15/04, prototype).

Due to the floats providing minimal neutral buoyancy, the skimmer is subjected to motion due to the volume of fluid in the suction hose and wave action. The skimmer is therefore unable to maintain stability on the surface and only remove the film. Due to wave action, the whole skimmer may be submerged at times. Another shortcoming of this skimmer is the great difficulty in adjusting the skimmer to the film's thickness, which makes initial deployment difficult and time consuming.

This skimmer is effective in removing thick layers of petroleum product, but when the layer is reduced to a film, the skimmer is unable to effectively handle the film. This makes the removal of the film a lengthy drawn out process that is both ineffective and time consuming.

OBJECTS OF THE INVENTION

Accordingly, it is an object of the present invention to provide a device and method for removing thin surface films of petroleum products from the water's surface which overcomes each of the above-referenced disadvantages and deficiencies of known devices.

To this end, it is an object of the present invention to provide a device which still remove thin films of petroleum products from the water quickly and effectively with a minimum intake of water.

It is also an object of the present invention to provide an improved and cost effective skimmer for removing petroleum products from the surface of the water.

SUMMARY OF THE INVENTION

The present invention recognizes the aforementioned problems with the related art and provides novel solutions thereto which overcome the disadvantages and deficiencies of presently known devices and techniques.

In accordance with the present invention, the invention is directed to a skimmer for removing petroleum from a water's surface, including a housing, a float connected to the housing, a ventilator disposed in communication with the housing, a movable inner cover at least partially disposed within the housing, a funnel at least partially disposed within the housing, the movable inner cover and the funnel forming a petroleum film receiving gap therebetween, and a vacuum hose disposed in communication with the funnel.

Also in accordance with the present invention, the invention is directed to a method for removing petroleum from a water's surface, including placing a skimmer on the water's surface, creating a petroleum concentrating gap between the skimmer and the water surface, adjusting a movable inner cover to the thickness of a petroleum film on the water surface to reduce the amount of water drawn into the skimmer, and drawing air through the skimmer to effectively increase the volume of petroleum product within the skimmer.

Further objects, advantages, and applications of the present invention will become apparent to those skilled in the art upon a review of the accompanying description of the preferred embodiment for practicing the invention, in conjunction with the accompanying drawings.

DETAILED DESCRIPTION OF THE PREFERRED EMBODIMENT OF THE PRESENT INVENTION

Figure 1:
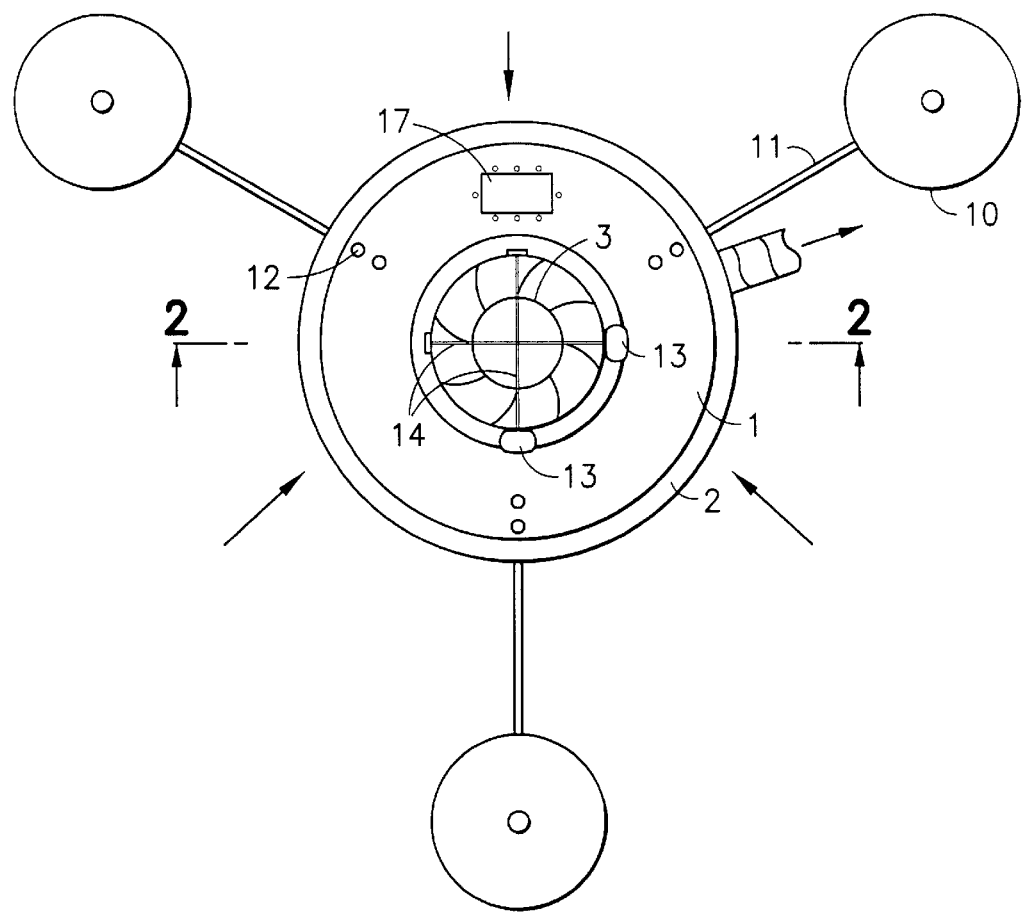
FIG. 1 is a plan view of a preferred embodiment of the present invention.
Figure 2:
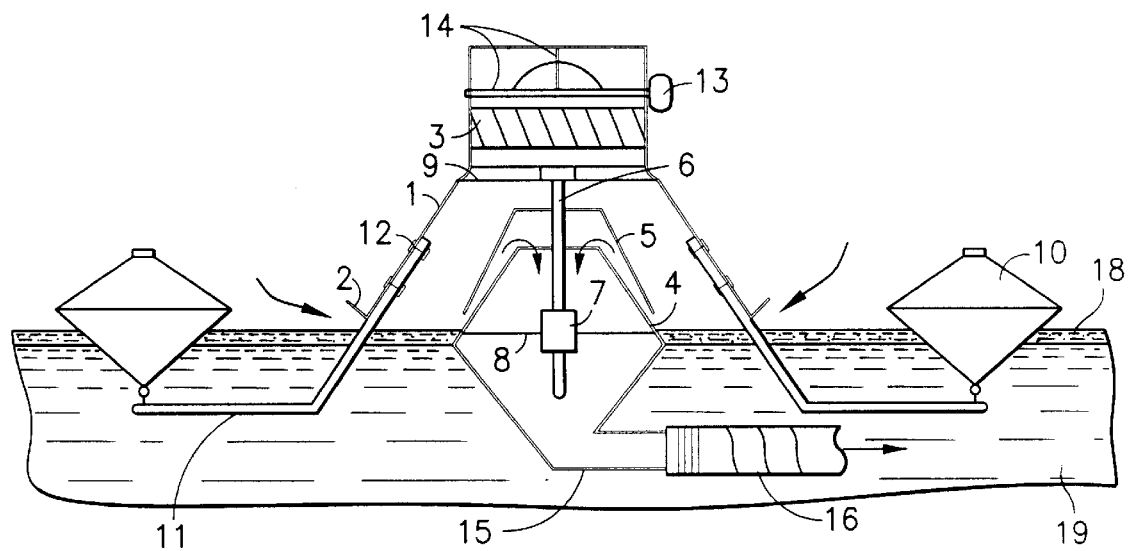
FIG. 2 is a cross-sectional view of the preferred embodiment of the present invention along lines A—A of FIG. 1.

With reference to FIGS. 1 and 2, the following is a detailed description of the preferred embodiment of the present invention. This device of the present invention contains the following elements: an outer cover 1, a flange with a pipe support 2, a ventilator 3, a skimmer funnel 4, an adjustable inner cover 5, a threaded shaft 6 to adjust the skimmer, a nut 7 for use with the threaded shaft 6, three support arms 8 for the nut 7, a chamber top 9, three floats 10, three float arms 11, two float arm attachment bolts 12 for each of the float arms 11, two servomotors or geared motors 13 for controlling movable vanes 14, a vacuum hose attachment fitting 15, a vacuum hose 16 with built in power/control cables and a viewing window 17.

The main purpose of this invention is to produce a skimmer which is specifically designed to remove thin films of petroleum products from the water, quickly and effectively with a minimum of water. This skimmer uses air suction to effectively increase the volume of petroleum product removed, while at the same time being able to handle very thin films effectively. At the same time, the positioning of the skimmer can be easily controlled by a single operator moving vanes 14, which are mounted on top of the ventilator housing 3. With the floats 10 providing excessive amounts of positive buoyancy, the ventilator is able to assist in the stability of the skimmer, without the skimmer increasing the pickup of water.

The skimmer also has a movable inner cover 5 which is adjustable to the thickness of the petroleum product's film, thereby greatly reducing the amount of water drawn into the skimmer. This is controlled by the gap between the skimmer's funnel 4, which is extended upward, and the moveable cover 5. The thinner the film, the smaller the gap.

There is also an outer cover which houses the ventilator 3. The flange 2 around the cover is wide and at a very shallow angle to the water's surface. The air rushing through this gap pulls the petroleum product film in and helps concentrate it, thereby making the skimmer's job easier by providing it with a thicker film of petroleum product. Housed above the ventilator 3 are two vanes 14 which deflect the airflow (the vanes are perpendicular to each other). These are used to maneuver the skimmer across the surface to bring it in contact with the petroleum product film. To most effectively use the skimmer, it is continuously moved across the film, "vacuuming" it up (just as one would vacuum up a carpet).

In use, this device may be used in any body of water having a petroleum product dispersed thereon in small or large quantities. These waters can be wide open waters, confining or small waters, or even waters with restricted or difficult access (land, water or both). First, the vacuum hose (which is preferably 4" in diameter) is attached. Then, power and control cable(s) are attached and the skimmer is lowered onto the water. The ventilator is started and the skimmer is moved onto the slick, at which time the vacuum pump is started. The vacuum hose 16 is either of a floating type or has floats attached. The cable(s) is either an integral part of the hose or is attached to it. This prevents the cable(s) from snagging subsurface debris, plants, etc.

It should be understood by those skilled in the art that other forms of applicant's invention may be made, all within the spirit of the invention and the scope of the claims.

What is claimed is:

1. A skimmer for removing petroleum from a water's surface, comprising:
    a housing, said housing comprising an outer cover and a flange disposed around said outer cover, said flange disposed at an angle to the water's surface to create a petroleum concentrating gap therebetween;
    a float connected to said housing;
    a ventilator disposed in fluid communication with said housing;
    a movable inner cover at least partially disposed within said housing;
    a funnel at least partially disposed within said housing, said movable inner cover and said funnel forming a petroleum film receiving gap therebetween; and
    a vacuum hose disposed in fluid communication with said funnel.

2. The skimmer of claim 1 further comprising a movable stability-enhancing vane mounted atop said housing.

3. A skimmer for removing petroleum from a water's surface, comprising:
    housing means;
    float means for maintaining buoyancy of said housing means;
    ventilator means for providing airflow within said housing means;
    vane means for deflecting said airflow and for maneuvering said housing cross the water's surface;
    adjustable cover and funnel means for creating an adjustable gap therebetween to receive a petroleum film therethrough; and
    vacuum means for removing said petroleum film received through said gap.

4. The skimmer of claim 3 further comprising flange means disposed around said housing means and at an angle to the water's surface for creating a petroleum concentrating gap therebetween.

5. A method for removing petroleum from a water's surface, comprising:
    placing a skimmer on said water's surface;
    creating a petroleum concentrating gap between said skimmer and said water surface;
    adjusting a gap between a skimmer funnel and a movable inner cover to the thickness of a petroleum film on said water surface to reduce the amount of water drawn into the skimmer; and
    drawing air through said skimmer to effectively increase the volume of petroleum product within said skimmer.

6. The method of claim 5 further comprising manipulating movable vanes to deflect airflow within said skimmer to maneuver the skimmer across the water surface and to bring the skimmer in contact with the petroleum.

7. A skimmer for removing petroleum from a water's surface, comprising:
    a housing;
    a movable stability-enhancing vane mounted atop said housing;
    a float connected to said housing;
    a ventilator disposed in fluid communication with said housing;
    a movable inner cover at least partially disposed within said housing;
    a funnel at least partially disposed within said housing, said movable inner cover and said funnel forming an adjustable petroleum film receiving gap therebetween; and
    a vacuum hose disposed in fluid communication with said funnel.

* * * * *